United States Patent [19]

Morita et al.

[11] 3,965,242
[45] June 22, 1976

[54] METHOD FOR DESULFURIZING EXHAUST GAS BY ALKALI SULPHITE-GYPSUM PROCESS

[75] Inventors: Tomijiro Morita; Isao Funahashi; Masayoshi Sugai; Atushi Sasakawa; Masakazu Takaiwa, all of Iwaki, Japan

[73] Assignee: Kureha Kagaku Kogyo Kabushiki Kaisha, Tokyo, Japan

[22] Filed: May 27, 1975

[21] Appl. No.: 580,793

Related U.S. Application Data

[63] Continuation of Ser. No. 331,879, Feb. 12, 1973, abandoned.

[30] Foreign Application Priority Data

Feb. 23, 1972 Japan.................................. 47-18760

[52] U.S. Cl................................ 423/166; 423/242; 423/519; 423/555
[51] Int. Cl.²..................... C01B 17/56; C01D 5/14; C01F 11/46

[58] Field of Search .......... 423/161, 166, 171, 242, 423/244, 554, 555, 558, 519

[56] References Cited
UNITED STATES PATENTS

| | | | |
|---|---|---|---|
| 1,104,897 | 7/1914 | Howard | 423/519 |
| 2,080,779 | 5/1937 | Lessing | 423/242 |
| 2,128,027 | 8/1938 | Clark | 423/555 |
| 3,520,649 | 7/1970 | Tomany et al. | 423/244 |
| 3,556,722 | 1/1971 | Owaki | 423/242 |
| 3,775,532 | 11/1973 | Shaw | 423/242 |
| 3,840,638 | 10/1974 | Morita et al. | 423/166 |
| 3,911,084 | 10/1975 | Wall et al. | 423/242 |

FOREIGN PATENTS OR APPLICATIONS 484,254  5/1938  United Kingdom.................. 423/519

Primary Examiner—Oscar R. Vertiz
Assistant Examiner—Gray P. Straub
Attorney, Agent, or Firm—Wenderoth, Lind & Ponack

[57] ABSTRACT

Process for through desulfurization of exhaust gas by treating the gas through the steps of absorption, double decomposition, oxidation, and alkali sulfate conversion.

3 Claims, 1 Drawing Figure

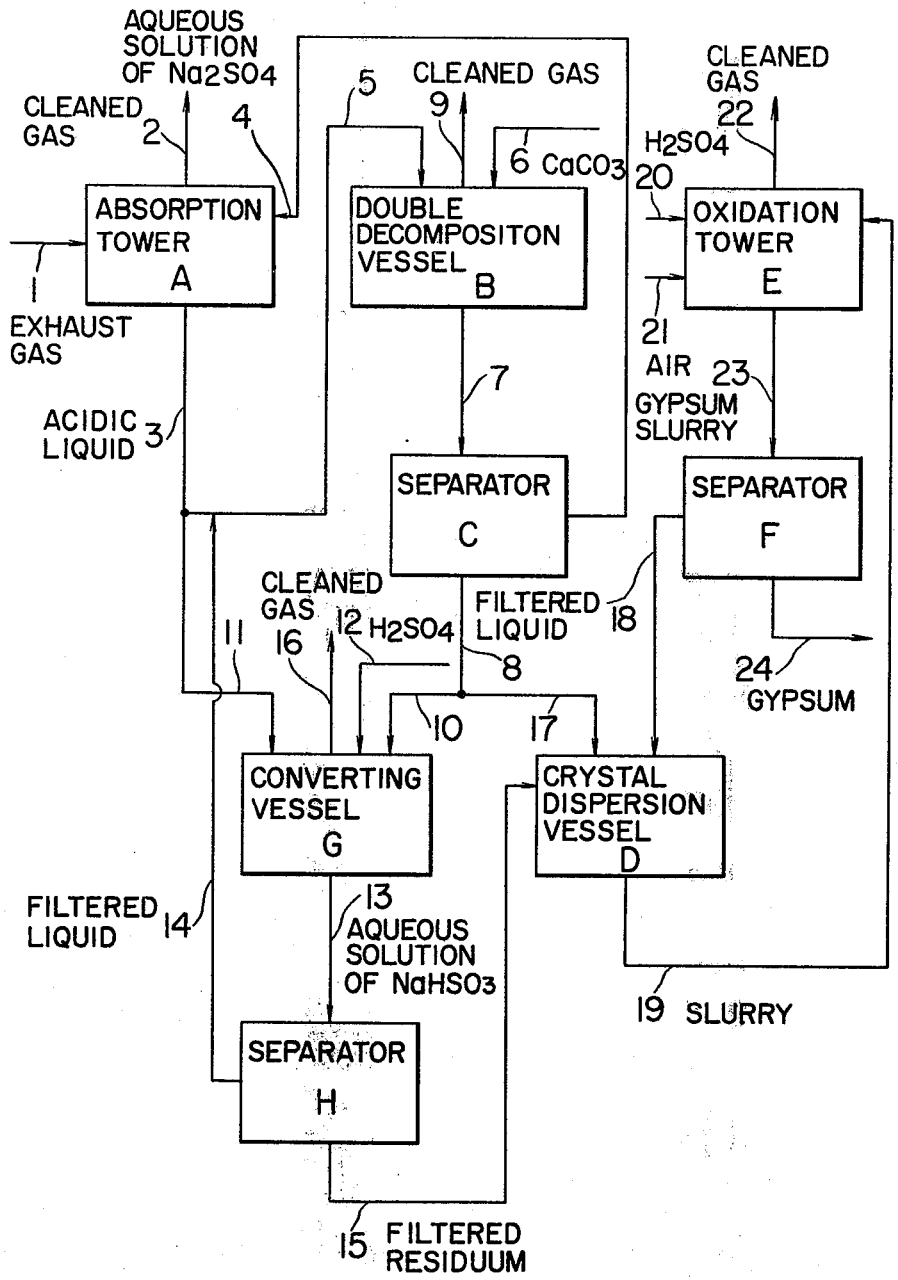

METHOD FOR DESULFURIZING EXHAUST GAS BY ALKALI SULPHITE-GYPSUM PROCESS

This is a continuation of application Ser. No. 331,879, filed Feb. 12, 1973, now abandoned.

This invention relates to a method for desulfurizing industrial exhaust gases containing therein oxides of sulfur. More particularly, it is concerned with a method for desulfurizing such exhaust gases by an alkali sulfate-gypsum process.

There have been proposed various methods for removing sulfur from industrial exhaust gases, the methods of which are divided into two major groups the "dry method" and the "wet method".

The dry method, because of its difficulty in handling solids in the absorption section of the installation as well as high cost in installing the equipment, is said to be disadvantageous in comparison with the wet method.

The wet method, on the other hand, is classified by the kinds of by-product to be yielded from the method, of which the "gypsum process" which yields calcium sulfite and gypsum as by-product is considered most preferable in view of recent increasing demand for these substances as architectural material.

The gypsum process is further divided into "a direct process" and "an indirect process", in which the former absorbs and fixes oxides of sulfur directly in a suspension liquid of calcium hydroxide (slaked lime), and the latter reacts lime or lime stone with a solution containing therein an absorbing agent to by-produce gypsum, and subsequently recycles the absorption liquid upon its regeneration to an absorption tower. In view of these facts the "indirect gypsum process" for the desulfurization has so far been considered very favorable for the stable operation of the desulfurization device, because there is no necessity of handling a suspension liquid in the operation of the absorption tower as in the direct process.

The present inventors noticed that aqueous solutions of alkali hydroxide and alkali sulfite have generally remarkably good absorbing efficiency with respect to the oxides of sulfur, and, based on this finding, they have conducted various studies and researches on the method for producing gypsum from an aqueous solution of alkali bisulfite resulting from absorption reaction of the oxides of sulfur, in the course of which principal attention was directed to conversion of alkali sulfate to gypsum, and alkali bisulfite capable of decomposing limes, since alkali sulfite changes into alkali sulfate having no absorbing capability by being oxidized with oxygen present in the exhaust gases. As the result of their strenuous experimental activities, an efficient alkali sulfate conversion method has been developed, by which gypsum can be effectively produced from exhaust gases.

It is therefore an object of the present invention to provide an effective method for desulfurizing exhaust gas.

It is another object of the present invention to provide a method for desulfurizing exhaust gas by an alkali sulfite-gypsum process.

According to the present invention, there is provided a method for desulfurizing exhaust gas, wherein industrial exhaust gas containing therein oxides of sulfur is first absorbed in an alkali sulfite solution, the resulted alkali bisulfite solution is subjected to double decomposition reaction with lime or lime stone, the produced calcium sulfite is separated, and the filtrate is recycled to the absorption process, the method also comprising suspending calcium sulfite produced in one part of the absorption liquid, adding sulfuric acid to the suspension liquid to lower the pH value thereof to 5 or below, separating the thus produced gypsum, and recycling the filtrate to a double decomposition stage.

The foregoing objects of the present invention will become more understandable from the following description when read in connection with the working examples and accompanying drawing.

In the drawing, the single FIGURE shows a flow diagram of one actual example of desulfurizing exhaust gas by the alkali sulfite-gypsum process according to the present invention.

First of all, the reactions according to the present invention are denoted by the following chemical equations.

1. Absorption
a. Principal Reaction $$SO_2 + M_2SO_3 + H_2O \rightarrow 2MHSO_3 \qquad (1)$$

b. Auxiliary Reaction $$M_2SO_3 + \tfrac{1}{2}O_2 \rightarrow M_2SO_4 \qquad (2)$$

2. Double Decomposition $$2MHSO_3 + CaCO_3 \rightarrow M_2SO_3 + CaSO_3 \cdot \tfrac{1}{2}H_2O + CO_2 + \tfrac{1}{2}H_2O \qquad (3)$$

3. Oxidation $$CaSO_3 \cdot \tfrac{1}{2}H_2O + 3/2 H_2O + \tfrac{1}{2}O_2 \rightarrow CaSO_4 \cdot 2H_2O \qquad (4)$$

4. Alkali Sulfate Conversion $$M_2SO_4 + 2CaSO_3 \cdot \tfrac{1}{2}H_2O + H_2SO_4 + 3H_2O \rightarrow 2CaSO_4 \cdot 2H_2O + 2MHSO_3 \qquad (5)$$

$$M_2SO_3 + CaSO \cdot \tfrac{1}{2}H_2O + H_2SO_4 + 3/2H_2O \rightarrow CaSO_4 \cdot 2H_2O + 2MHSO_3 \qquad (6)$$

(M represents alkali metals such as Na, K, Sr, etc.)

In the absorption step, it may be possible to reduce the degree of oxidation of sulfites by use of antioxidants such as hydroquinone, para-phenylene diamine, etc.. However, it is unavoidable that sulfates are still produced and accumulated even if such antioxidants are used, with the result that absorption capability decreases, and consequently, separation of the sulfates is necessary.

According to the present invention, principal emphasis was placed on the conversion of alkali sulfate to gypsum and alkali bisulfite, wherein consideration was given to the use of, as far as possible, materials which were themselves produced in the process. Thus, various experiments were conducted as regards the reactions in the alkali sulfates - calcium sulfite - sulfuric acid system. As the result, it has been recognized that reaction between a mixture solution of alkali bisulfite or alkali sulfite, and alkali sulfate, in which calcium sulfite is suspended, and sulfuric acid is able to efficiently convert alkali sulfate to alkali bisulfite, and that gypsum produced therefrom has a particle size range of 30 to 50 microns, the particle size of which indicates excellent capability of being filtered and separated.

The required quantity of calcium sulfite and sulfuric acid to be added in the alkali sulfate conversion step can be calculated from the above equations (5) and (6). In the actual operation, an amount of from 0.8 to 2.5 times as large as the equivalent amount of each of these substances may be used, and the quantitative relationship between calcium sulfite and sulfuric acid may be adjusted in such a manner that the pH value of the prepared liquid is 5 or below, or, more preferably, in the range from 2 to 4.

In the following, one actual embodiment of desulfurizing exhaust gas by the alkali sulfite-gypsum process will be explained with reference to the accompanying drawing.

At first, 5,000 Nm$^3$/h of exhaust gas 1 discharged from a thermal-power plant is caused to contact, in an absorption tower A, 991.5 kg/h of an aqueous solution 4 containing therein approximately 12% of $Na_2SO_3$ and approximately 7% of $Na_2SO_4$, whereby 98% of sulfur dioxide ($SO_2$) in the exhaust gas can be removed. As the result of this absorption reaction, an aqueous solution 3 of 7% $NaHSO_3$, 8% $Na_2SO_3$ and 8% $Na_2SO_4$, and having a pH value of 6.1 is obtained. (This aqueous solution will hereinafter be referred to as "acidic liquid".) At this time, 2.61 kg/h of $Na_2SO_4$ is produced in the absorption tower. This $Na_2SO_4$ of the specified quantity is one which is to be converted to $NaHSO_3$ in a subsequent converting vessel G, which is the primary consideration of the present invention.

The acidic liquid 3 is then partly transferred to the converting vessel G, the remainder thereof being merged and mixed with the filtrate 14 from the separator H, and is forwarded to a double decomposition vessel B where it reacts with 41.5 kg/h of calcium carbonate, $CaCO_3$, 6. In this case, a liquid 5 fed into the double decomposition vessel B is an aqueous solution containing therein 8.1% of $NaHSO_3$, 7.5% of $Na_2SO_3$, 6.7% of $Na_2SO_4$, and 0.3% of $Ca(HSO_3)_2$ in an amount of 1,015.7 kg/h. The reaction is conducted at about 80°C.

An aqueous solution 7, in which $CaSO_3 \cdot \frac{1}{2}H_2O$ is suspended and which is taken out of the double decomposition vessel B, is sent into and separated by a separator C, whereby 991.5 kg/h of an aqueous solution 4 containing 0.7% of $NaHSO_3$, 12.3% of $Na_2SO_3$, and 6.9% of $Na_2SO_4$, and $CaSO_3 \cdot \frac{1}{2}H_2O$, 8 containing a certain amount of $CaCO_3$ are obtained. The aqueous solution 4 is then added with 4.4 kg/h of water and sent into the absorption tower, while a portion of the $CaSO_3 \cdot \frac{1}{2}H_2O$, 8 is sent into the converting vessel G, and the remainder thereof is oxidized in an oxidation tower E.

In the meantime, a part of the acidic liquid 11 from the absorption tower A in an amount of 59.8 kg/h and a part of the $CaSO_3 \cdot \frac{1}{2}H_2O$, 10 from the separator C in an amount of 13.54 kg/h are mixed in the converting vessel G. Simultaneously, 7.65 kg/h of sulfuric acid 12 is added to this mixture, and a reaction was conducted at 40°C for 80 minutes. As the result of this reaction, aqueous solution 13 of $NaHSO_3$ having a pH value of 3.1 and in which gypsum is suspended is obtained. The solution 13 is then sent into a separator H where it is separated into solid and liquid by filtration, the filtrate 14 being recycled to the double decomposition vessel B together with the remainder of the acidic liquid 3, and the filter cake 15 is sent into a crystals dispersion vessel D.

In the crystals dispersion vessel D, the filter cake 15 and a mixture 17 consisting principally of calcium sulfite are suspended by the filtrate 18 coming out of a separator F to prepare slurry 19 containing 0.5% of $CaCO_3$, 6.45% of $CaSO_3 \cdot \frac{1}{2}H_2O$, and 2.9% of $CaSO_4 \cdot 2H_2O$ which is then sent into the oxidation tower E.

In the oxidation tower E, $CaSO_3 \cdot \frac{1}{2}H_2O$ contained in the slurry 19 is oxidized with air 21 of approximately 2 to 3 times the equivalent amount of calcium sulfite, while adjusting acidity of the slurry with sulfuric acid 20 fed at a rate of 3 kg/h. The gypsum slurry 23 resulting from the oxidation is transferred to separator F wherein it is separated into filtered liquid 18 and gypsum 24, said filtered liquid 18 being sent to crystal dispersion vessel D. The separated gypsum 24 has a purity of 99.4% and is obtained at a yield of 71.3 kg/h.

In order to enable persons skilled in the art to readily reduce the present invention into practice, the following examples are presented. It should, however, be noted that these examples are illustrative only, and are not intended to limit the scope of the present invention. Rather, any change and modification may be made within the ambit of the disclosure and the appended claims.

EXAMPLE 1

151 g of calcium sulfite was suspended in 800 g of 10.4% solution of sodium sulfate, thereafter 96 g of 60% conc. sulfuric acid was added dropwise into the suspension liquid, while agitating the same, and the reaction was carried out at 40°C for 80 minutes.

The reaction product was separated by filtration. When the contents of sodium sulfate and sodium bisulfite were measured in the filtrate, they were found to be 35.3 g and 104.3 g, respectively, and the rate of removal of sodium sulfate from the reaction solution by conversion was 57.7%. Further, when crystals of the reaction product were examined through a microscope, they had an average particle size of 40 microns, which indicates excellent separation by filtration.

As the result of the above reaction, it was made clear that alkali sulfate could be converted to alkali bisulfite by the reaction of calcium sulfite and sulfuric acid, and that the resulting crystals of the reaction product had sufficient filtrability. However, in the desulfurization of exhaust gas by the alkali sulfite-gypsum process, as it is not advantageous to use an aqueous solution of alkali sulfate alone for the required conversion, another, converting experiment was carried out by using an outlet solution from an absorption tower which contains alkali bisulfite, alkali sulfite, and alkali sulfate, and calcium sulfite to be obtained by the present invention. This is presented in the subsequent Example 2.

EXAMPLE 2

Into a glass vessel of a 1-liter capacity having an agitator, there was charged one example of the outlet solution of the present invention which was 500 g of an aqueous solution containing therein 7.9% of sodium bisulfite, 9.4 % of sodium sulfite, and 5.9% of sodium sulfate. In this aqueous solution 102.9 g of calcium sulfate was suspended, to which 60% conc. sulfuric acid was further added in an amount of 57.9 g, and a reaction was conducted at 40°C for 80 minutes.

The reaction product was separated by filtration, and the filtrate was analyzed, from which it was verified that the content of sodium sulfate was 11.1 g, the rate of removal of the Glauber's salt was approximately 62.4 %, and the crystals of the reaction product ranged from 30 to 50 microns which revealed excellent filtrability.

What we claim is:

1. In a process for desulfurizing exhaust gas containing oxides of sulfur, including sulfur dioxide, and oxygen, which comprises (a) contact-reacting said exhaust gas with a solution containing an alkali metal sulfite to absorb a major portion of the sulfur dioxide and thus form an absorption liquid containing the alkali metal sulfite, the corresponding alkali metal bisulfite and the corresponding alkali metal sulfate, (b) adding lime or lime stone to the absorption liquid to cause a double decomposition reaction between the lime or lime stone and the alkali metal bisulfite contained in the absorption liquid and thus produce the corresponding alkali metal sulfite and calcium sulfite, (c) separating the calcium sulfite from the resultant mixture and recycling the filtrate obtained therefrom to step (a), and (d) converting the separated calcium sulfite to produce gypsum, the improvement which comprises suspending a portion of the separated calcium sulfite in a portion of the absorption liquid formed in step (a), while adding sulfuric acid to the resultant suspension to lower the pH value thereof to from 2 to 4 to (1) convert the alkali metal sulfate contained in said portion of the absorption liquid to the corresponding alkali metal bisulfite and (2) convert the suspended calcium sulfite to gypsum, separating the gypsum from the resultant mixture and recycling the filtrate obtained therefrom to step (b), the remaining portion of the separated calcium sulfite being subjected to oxidation.

2. The process according to claim 1, in which the treatment involving the sulfuric acid is conducted at a temperature of 40°C for 80 minutes.

3. The process according to claim 1, in which the particle size of the gypsum obtained is from 30 to 50 microns.

* * * * *